United States Patent [19]

Izumi et al.

[11] Patent Number: 4,497,294

[45] Date of Patent: Feb. 5, 1985

[54] ELECTRONICALLY CONTROLLED GOVERNOR FOR DIESEL ENGINES

[75] Inventors: Kouichi Izumi, Shiki; Yasuhiro Hiyama, Musashino, both of Japan

[73] Assignee: Diesel Kiki Co., Ltd., Japan

[21] Appl. No.: 532,735

[22] Filed: Sep. 15, 1983

[30] Foreign Application Priority Data

Sep. 16, 1982 [JP] Japan ................. 57-159680

[51] Int. Cl.³ ............................. F02D 31/00
[52] U.S. Cl. ............................ 123/357
[58] Field of Search ................. 123/357-359

[56] References Cited

U.S. PATENT DOCUMENTS

| | | | |
|---|---|---|---|
| 3,713,427 | 1/1973 | Adler ................ | 123/357 |
| 4,219,000 | 8/1980 | Locher et al. ........ | 123/357 |
| 4,279,229 | 7/1981 | Arnold et al. ....... | 123/357 |
| 4,372,266 | 2/1983 | Hiyama et al. ....... | 123/357 |
| 4,423,485 | 12/1983 | Sami et al. ......... | 123/357 |

FOREIGN PATENT DOCUMENTS 75929 6/1981 Japan ................. 123/357

*Primary Examiner*—Magdalen Y. C. Moy
*Attorney, Agent, or Firm*—Guy W. Shoup; Gerard F. Dunne

[57] ABSTRACT

An electronically controlled governor for Diesel engines, having a computing circuit responsive to at least one signal indicative of an operating condition of the Diesel engine at each instant for computing positional data showing a target position of a fuel adjusting member for obtaining an amount of fuel injection corresponding to the operating condition and a correcting circuit for effecting a data correcting operation on the positional data in accordance with predetermined correction formulae. The coefficients in said data correction formulae are determined in accordance with the detected operating condition of the Diesel engine. Since the coefficients for correcting the control characteristic can be continuously changed in response to the operating condition of the engine, a stable and highly responsive governor characteristic can be realized without the use of a complicated circuit arrangement.

6 Claims, 6 Drawing Figures

FIG. 4
FIG. 5
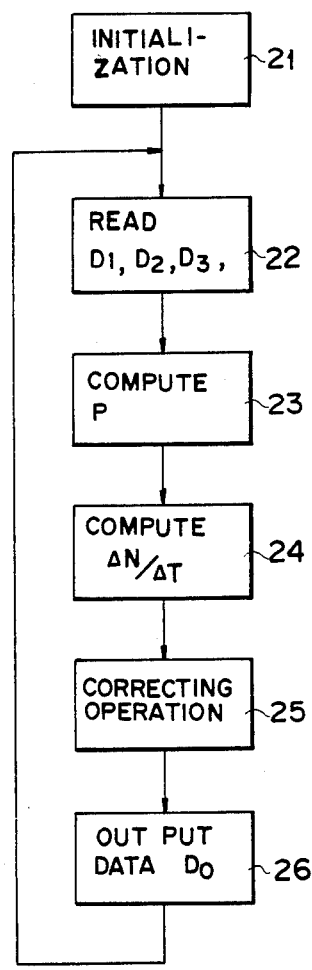
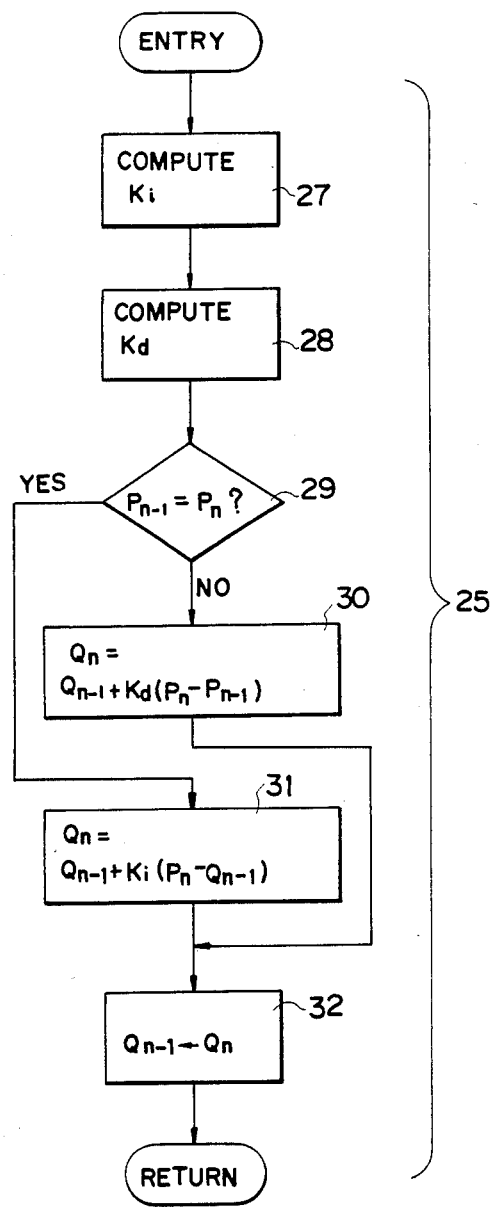

ELECTRONICALLY CONTROLLED GOVERNOR FOR DIESEL ENGINES

The present invention relates to an electronically controlled governor for Diesel engines, and more particularly, to an electronically controlled governor for Diesel engines, in which the speed control characteristic is controlled to an optimum state according to the operating condition of the engine at each instant.

As shown in FIG. 1, a conventional electronically controlled governor system for a Diesel engine comprises a computing circuit 2 for computing the control position of a rack (not shown) for controlling the amount of fuel injected by an injection pump, a compensating filter 3 and a servo circuit 4 to which the output signal from the computing circuit 2 is applied through the compensating filter 3, and the amount of fuel supplied to the Diesel engine 5 is controlled by controlling the position of the rack for fuel control using the servo circuit 4. Data $A_1$ indicative of the amount of the operation of an accelerator pedal (not shown) and data $A_2$ indicative of the temperature of the engine coolant are applied to the computing circuit 2, and furthermore, data $A_3$ indicative of the rotational speed of the Diesel engine 5 is also appled to the computing circuit 2 as a feedback signal to form a closed loop control system, so that the speed of the Diesel engine 5 may be controlled in accordance with the predetermined governor characteristic.

The compensating filter 3 provided for assuring the stable operation of the closed loop control system for engine speed control is arranged as a CR filter having two resistors 6 and 7 and a capacitor 8 as shown in FIG. 2. As a result, the transfer characteristic of the compensating filter 3 is a fixed characteristic determined by the values of these CR elements. Such a conventional governor system is disclosed, for example, in U.S. Pat. No. 4,279,229.

It is, however, preferable that the transfer characteristic of the compensating filter 3 used for the above purpose be adjustable so as to obtain the optimum speed control characteristic for the conditions of engine operation, load condition and the like at each instant. In fact, however, the speed control characteristic of the compensating filter is almost never controlled at present because, with the conventional circuit arrangement, such control can be realized only by employing a very complicated circuit arrangement and at high cost. As a result, it has been difficult to obtain a stable and highly responsive control characteristic over the desired operational range even if the compensating filter is provided in the closed loop control system.

It is, therefore, an object of the present invention to provide an electronically controlled governor for Diesel engines, which is able to control the engine speed in accordance with the operating conditions at each instant.

It is another object of the present invention to provide an electronically controlled governor for Diesel engines, which corrects the characteristic of the speed change rate of the Diesel engine in accordance with the operating conditions of the engine at each instant so as to obtain the optimum speed control characteristic according to the operating conditions of the engine at each instant.

The electronically controlled governor for a Diesel engine according to the present invention comprises means responsive to at least one signal representing an operating condition of the engine at each instant for computing data indicative of the position which a member for controlling the amount of fuel injected must assume in order to obtain the predetermined governor characteristic, at least one detecting means for detecting said operating condition of the engine, means for effecting a predetermined data correcting operation on said data in order to increase the response characteristic for a rapid change in the condition of engine operation as well as to stabilize the control system, and means for determining the coefficients used in the above data correcting operation in accordance with the result of detection by the above detecting means. In this way, stable and highly responsive control can be secured for any operating and loading condition of the Diesel engine. As predetermined operating conditions to be detected by the at least one detecting means, one or more of the following can be selected: the rotational speed of the engine, the amount of change per unit time of the engine speed, the amount of operation of the accelerator pedal, the amount of change per unit time thereof, the difference between the target engine speed and the actual engine speed, the temperature of the engine coolant and so forth.

According to the present invention, since the coefficients for correcting the control characteristic can be continuously changed in response to the changes in the desired parameters relating to the operation of the engine, it is possible to realize a stable and highly responsive governor characteristic in response to any operating and loading conditions of the engine without the use of a complicated circuit arrangement. Furthermore, the governor of the present invention can be applied to different types of engines or to engines for different purposes without changing any physical components but only by re-writing the data stored in a microprocessor. The present invention is also applicable to both the in-line type and the distribution type of injection pumps. Therefore, this system has the advantage of enjoying extremely wide application.

Further objects and advantages of the present invention will be apparent from the following detailed description to be read in conjunction with the accompanying drawings in which:

FIG. 4 is a flow chart of the program which is executed in the microprocessor shown in FIG. 3;

FIG. 5 is a detailed flow chart of the operation correcting step in FIG. 4;

Figure 3:
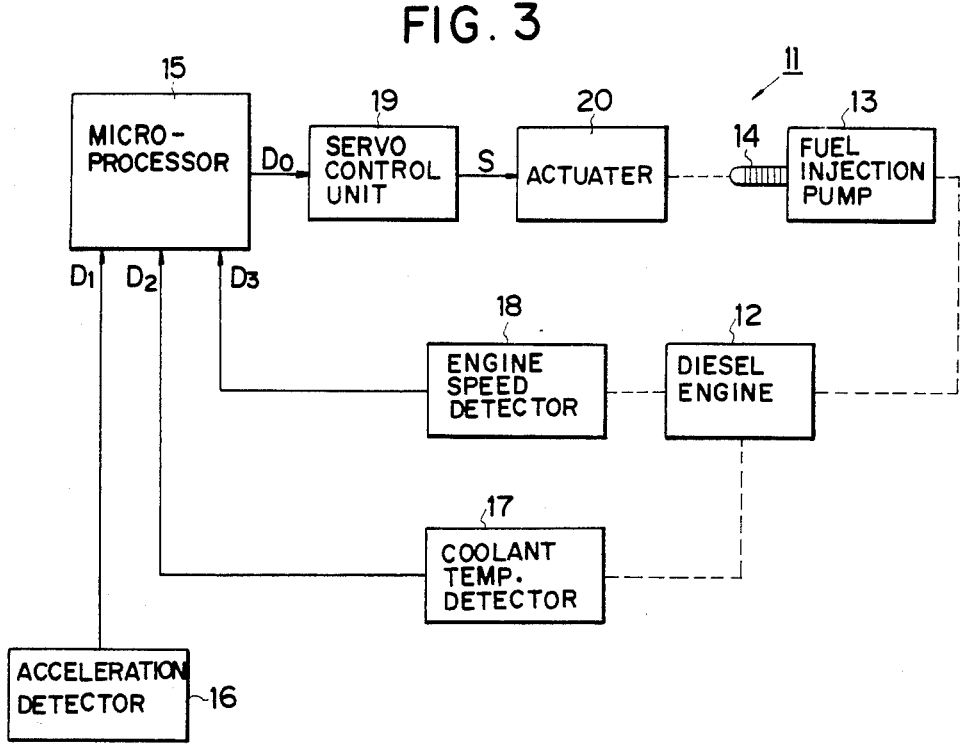
FIG. 3 is a schematic block diagram of an electronically controlled governor system of the present invention.

FIG. 3 is a schematic block diagram of one embodiment of an electronically controlled governor for Diesel engines of the present invention. The electronically controlled governor 11 is a device for adjusting the position of a fuel adjusting member 14 of an injection pump 13 for injecting and supplying fuel to a Diesel engine 12 in order to control the speed of the Diesel engine 12 in accordance with a predetermined governor characteristic. The governor 11 has a microprocessor 15 for computing the control position of the fuel adjusting member 14, and accelerator data $D_1$ showing the operation amount of the accelerator pedal (not shown) and coolant temperature data $D_2$ showing the temperature of the engine coolant are applied to the microprocessor 15 from an acceleration detecter 16 and coolant temperature detector 17, respectively. Furthermore, speed data $D_3$ indicating the rotational speed of the Diesel engine 12 at each instant is also applied to the microprocessor 15 from an engine speed detector 18 as feedback information, and the computation for positioning the fuel adjusting member 14 is carried out as stated below on the basis of these input data $D_1$, $D_2$ and $D_3$.

Position control data $D_0$ obtained as a result of computation in the microprocessor 15 is applied to a servo control unit 19 to produce a driving signal S from the servo control unit 19. The driving signal S is applied to an actuator 20 connected with the fuel adjusting member 14, and then, the position of the fuel adjusting member 14 is positioned at the location indicated by the position control data $D_0$.

FIG. 4 shows a flow chart for a computing program for positioning the fuel adjusting member 14 to be executed in the microprocessor 15. In this program, after an initializing operation in step 21, the data $D_1$, $D_2$, $D_3$ are read into the microprocessor 15 (step 22) and the computation for obtaining positional data P indicative of the optimum position of the fuel adjusting member 14 at each instant is carried out on the basis of these input data (step 23).

The computation of the positional data P is for determining the target position of the fuel adjusting member 14 to be positioned in accordance with the input data $D_1$, $D_2$ and $D_3$ so as to control the engine speed in accordance with a predetermined governor characteristic curve. The computation can be executed by the use of a circuit wherein the various data indicating the position of the fuel adjusting member 14 are stored in a ROM in advance, an address value determined by the input data $D_1$, $D_2$, $D_3$ is applied to the ROM as address data, whereby the positional data P showing the optimum position of the fuel adjusting member 14 is read out from the ROM in accordance with the combination of the input data $D_1$, $D_2$ and $D_3$.

Figure 1:
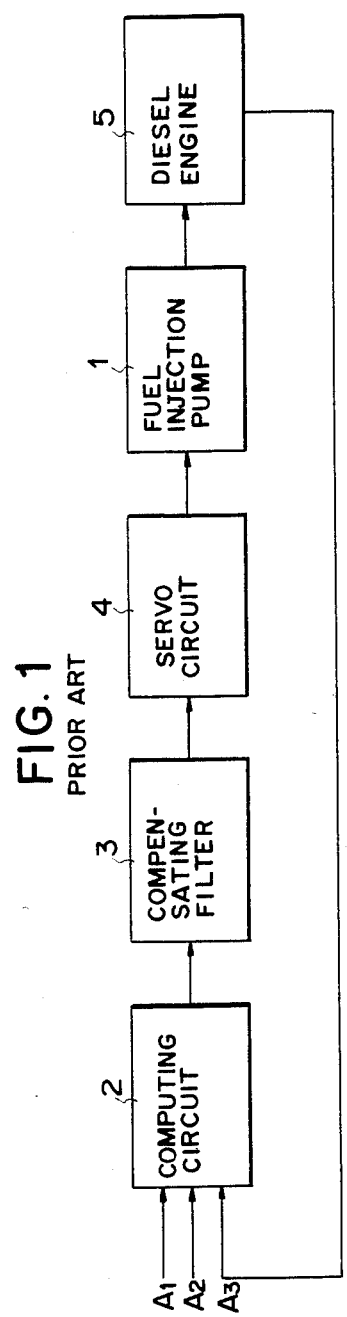
FIG. 1 is a schematic block diagram of the conventional electronically controlled governor system.
Figure 2:
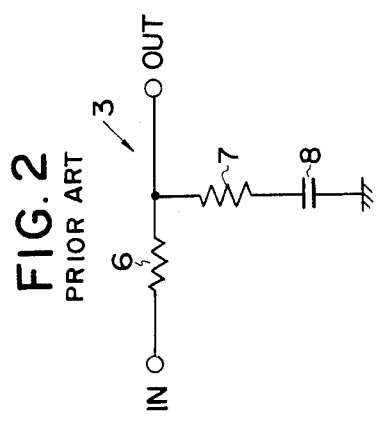
FIG. 2 is a circuit diagram of the compensating filter in the governor system shown in FIG. 1.

Steps 24 and 25 are provided in order to effect by programmed processing the same kind of correction of the positional data P as that effected by the use of the filter circuit shown in FIG. 2. After the value of $\Delta N/\Delta T$ which is the amount of change of the engine speed per unit time is computed in step 24 on the basis of the data $D_3$ indicative of the engine speed, the correcting operation is effected on the data P in the next step 25 on the basis of the value of $\Delta N/\Delta T$. The order of step 23 and step 24 can be reversed.

Figure 6:
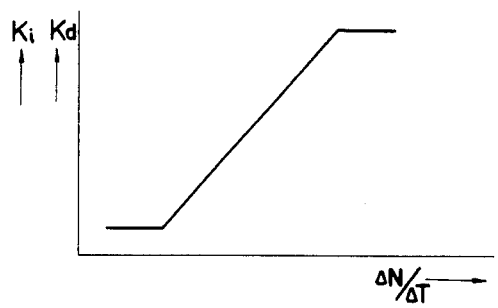
FIG. 6 is a characteristic curve showing the relationship among the coefficients Ki, Kd and the speed vibration rate $\Delta N/\Delta T$.

FIG. 5 shows a flow chart for the program for the correcting operation performed in step 25. At first, in steps 27 and 28, integration coefficient Ki and differentiation coefficient Kd are computed on the basis of the value $\Delta N/\Delta T$. Ki and Kd are respectively coefficients for determining the characteristics of integral operation and differential operation in the filter circuit having the arrangement shown in FIG. 2, and change in magnitude in accordance with the value of $\Delta N/\Delta T$ as shown in FIG. 6. When the magnitude of the coefficients Ki and Kd are determined in this way, the positional data $P_n$ computed in step 23 in this program cycle is compared in step 29 with the positional data $P_{n-1}$ computed one program cycle before. When $P_n = P_{n-1}$, the computation expressed by the following formula is carried out in step 31.

$$Q_{n-1} + Ki(P_n - Q_{n-1}) \quad (1)$$

wherein, $Q_{n-1}$ indicates the corrected amount of fuel injected based on the positional data $P_{n-1}$ computed one program cycle before. The data obtained as a result of the computation in accordance with the formula (1) is stored in a memory (not shown) in the microprocessor 15 as data $Q_n$.

On the other hand, when $P_n \neq P_{n-1}$, a computation according to the following formula is carried out in step 30, and the result of the computation is stored in the memory as data $Q_n$.

$$Q_{n-1} + Kd(P_n - P_{n-1}) \quad (2)$$

The data $Q_n$ obtained in this way by one or the other of the above computations is stored as $Q_{n-1}$ for use in the computation in the next program cycle (step 32), and the correcting operation is completed.

In the flow chart shown in FIG. 4, data $Q_{n-1}$ obtained by the correcting computation in step 25 is converted into position control data $D_0$ showing the position of the fuel adjusting member 14 which corresponds to the amount of fuel injected indicated by the data $Q_{n-1}$ in step 26 and the servo control unit 19 produces the driving signal S on the basis of the position control data $D_0$. The actuator 20 drives the fuel adjusting member 14 in response to the driving signal S, so that the member 14 is positioned to provide the amount of fuel injection determined by the computation in step 30 or 31.

According to the above-mentioned arrangement, integration coefficient Ki and differentiation coefficient Kd can be easily changed in accordance with the change rate of the engine speed and the positional data P which is obtained in step 23 can be corrected in accordance with the operating condition of the engine at each instant without the employment of a complicated mechanical device. As a result, the engine can be controlled at an optimum speed change rate corresponding to the operating condition at each instant.

In the above embodiment, formulae (1) and (2) are employed in order to carry out the same correction of the data P as that performed by the filter circuit shown in FIG. 2. However, the present invention is not limited to the compensations represented by these formulae for the correcting operation. For example, the computations in steps 30 and 31 can instead be carried out in accordance with the following formulae (3) and (4):

$$Q_{n-1} + Ki(P_n - Q_{n-1})^2 \quad (3)$$

and $$Q_{n-1} + Kd(P_n - P_{n-1})^2 \quad (4)$$

The use of formulae (3) and (4) provides more responsive correcting characteristics.

Furthermore, in the above embodiment, although the device is so arranged that the coefficients Ki and Kd are changed according to the value of $\Delta N/\Delta T$ which is the amount of change of rotational speed N of the engine per unit time, the coefficients Ki and Kd may be changed according to other parameters such as the amount of operation of the accelerator, the amount of change per unit time thereof, the difference between the target engine speed and the actual rotational engine speed, the temperature of the coolant of the engine and so on.

Further, instead of the above embodiment where stable control is secured in the state $0<Ki<Kd<1$, a larger differential effect can be expected when $Kd>1$.

We claim:

1. An electronically controlled governor for Diesel engines, in which the positional control of a fuel adjusting member of a fuel injection pump for injecting and supplying fuel to a Diesel engine is electronically carried out to control the rotational speed of the Diesel engine, said governor comprising:
   - a computing means responsive to at least one signal indicative of an operating condition of the Diesel engine at each instant for computing positional data showing a target position of said fuel adjusting member for obtaining an amount of fuel injection corresponding to said operating condition;
   - at least one detecting means for detecting said operating condition of the Diesel engine;
   - a correcting means for effecting a data correcting operation on said positional data in accordance with predetermined correction formulae in order to stabilize the controlling operation and to improve the response characteristics with respect to rapid changes in the condition of engine operation;
   - means for determining the coefficients in said data correction formulae in accordance with the detected result of said detecting means; and
   - means responsive to the output data from said correcting means for controlling the position of said fuel adjusting member.

2. An electronically controlled governor as claimed in claim 1 wherein the speed variation rate of said Diesel engine is detected by said detecting means and the coefficients of said correction formulae are determined in accordance with said speed variation rate.

3. An electronically controlled governor as claimed in claim 1 wherein a predetermined data correcting operation including a differentiation/integration operation is carried out by said correcting means.

4. An electronically controlled governor as claimed in claim 1 wherein said computing means and said correcting means include a microprocessor in which a predetermined program is executed to perform the computation for obtaining the positional data and for the data correcting operation.

5. An electronically controlled governor as claimed in claim 4 wherein said data correcting operation has a step for comparing positional data $P_n$ obtained in the current program cycle with positional data $P_{n-1}$ obtained in the preceding program cycle, and a step for determining the amount $Q_n$ of fuel to be injected in accordance with the following formula:

$$Q_n = Q_{n-1} + Kd(P_n - P_{n-1})$$

wherein, $Q_{n-1}$ is a corrected amount of fuel to be injected and $Kd$ is a differentiation coefficient; when $P_n \neq P_{n-1}$; or $$Q_n = Q_{n-1} + Ki(P_n - Q_{n-1})$$

wherein, $Ki$ is an integration coefficient.

6. An electronically controlled governor as claimed in claim 5 wherein the speed variation rate of said Diesel engine is detected by said detecting means and the differentiation coefficient $Kd$ and the integration coefficient $Ki$ are determined in accordance with the value of the speed variation rate.

* * * * *